April 11, 1967  J. W. GWINN  3,313,430
TAILGATE HOIST

Filed April 30, 1965  3 Sheets-Sheet 1

INVENTOR.
JAMES W. GWINN
BY
*Wells & St. John.*
ATTYS.

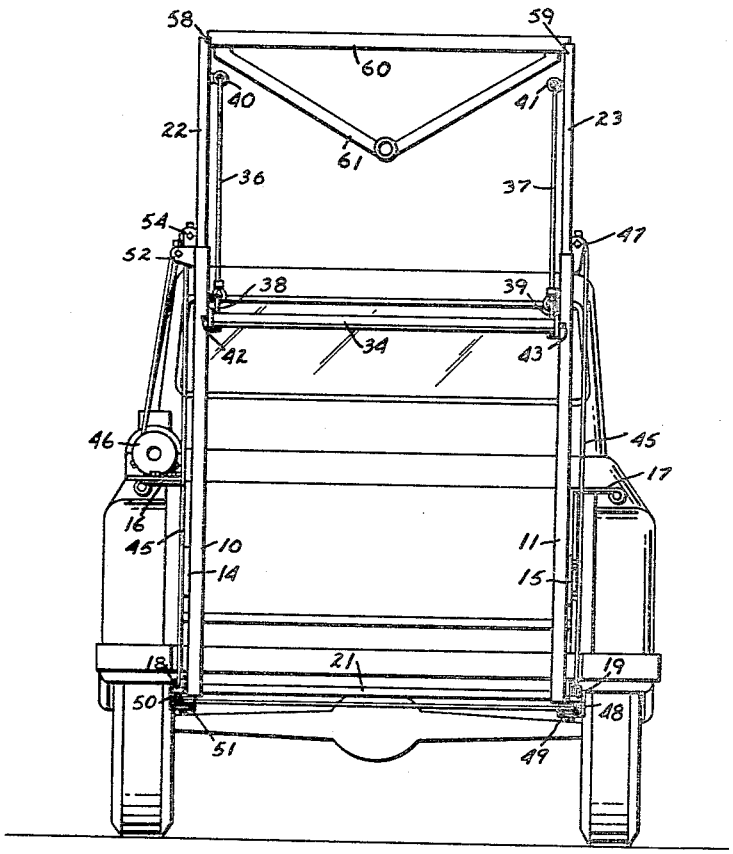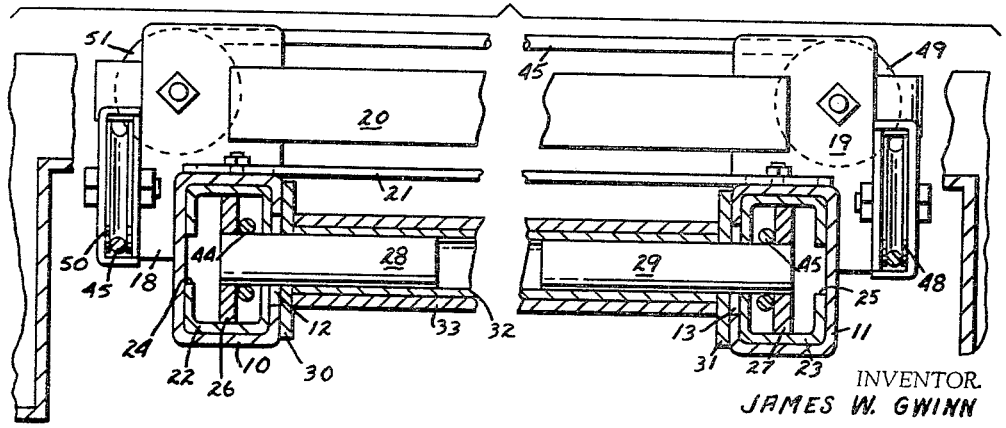

April 11, 1967    J. W. GWINN    3,313,430
TAILGATE HOIST
Filed April 30, 1965    3 Sheets-Sheet 3
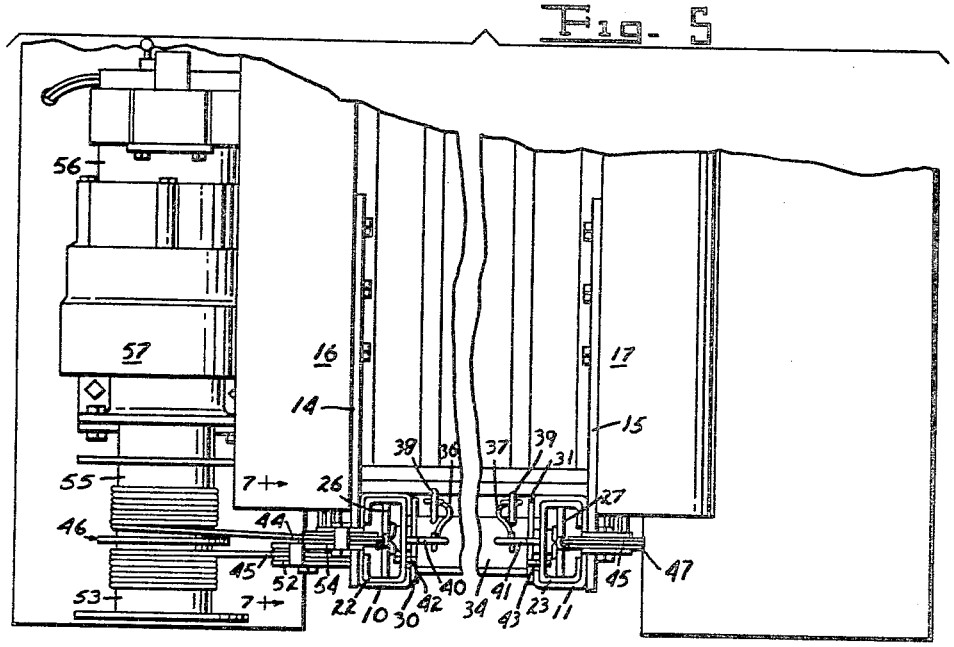
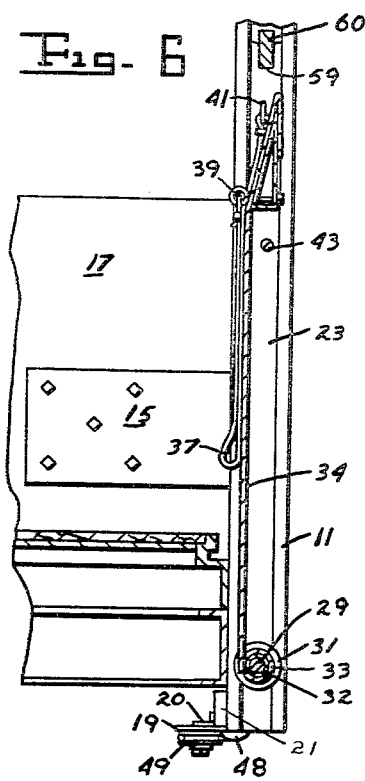
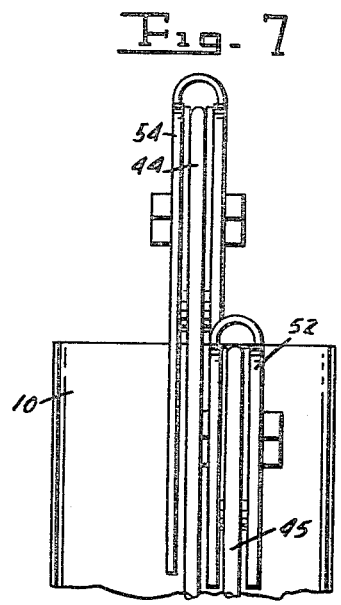
INVENTOR.
JAMES W. GWINN
BY Wells & St John
ATTYS.

United States Patent Office 3,313,430
Patented Apr. 11, 1967

3,313,430
TAILGATE HOIST
James W. Gwinn, P.O. Box 28, Pomeroy, Wash. 99347
Filed Apr. 30, 1965, Ser. No. 452,069
3 Claims. (Cl. 214—75)

My invention relates to the provision of a combination tailgate and hoist for trucks. It is particularly applicable to that type of automotive vehicle commonly described as a "pick-up" truck, but is not limited thereto.

It is the purpose of my invention to provide a simple combination of pairs of telescoping standards, a tailgate with connections to the movable standards of the pairs and capable of being held in upright body closing position or horizontal rearwardly extending position, flexible lift members such as cables with a power driven winch and sheaves for lifting and lowering the movable standards, all of such parts being mounted by simple brackets upon the vehicle body, and, the combination being capable of moving the tailgate from a position at ground level to a position well above the floor of the vehicle body and holding it stationary at any point within the limits of its movement.

The nature and advantages of my invention and the essential parts of the device embodying my invention will appear more fully from the following description and the accompanying drawings illustrating a preferred form of the invention.

In the drawings:

FIGURE 3 is a view similar to FIGURE 1, showing the tailgate elevated to its uppermost position;

FIGURE 4 is an enlarged plan sectional view taken substantially on the line 4—4 of FIGURE 1, illustrating the construction of the supporting standards and the connections of the tailgate and the flexible lifting members thereto;

FIGURE 5 is an enlarged top view looking down at the device from the line 5—5;

FIGURE 6 is an enlarged fragmentary sectional view taken on the line 6—6 of FIGURE 1; and FIGURE 7 is an enlarged fragmentary side view showing the arrangement of the guide sheaves at the top of the fixed standard at the side of the body where the power operated winch is located.

Figure 2:
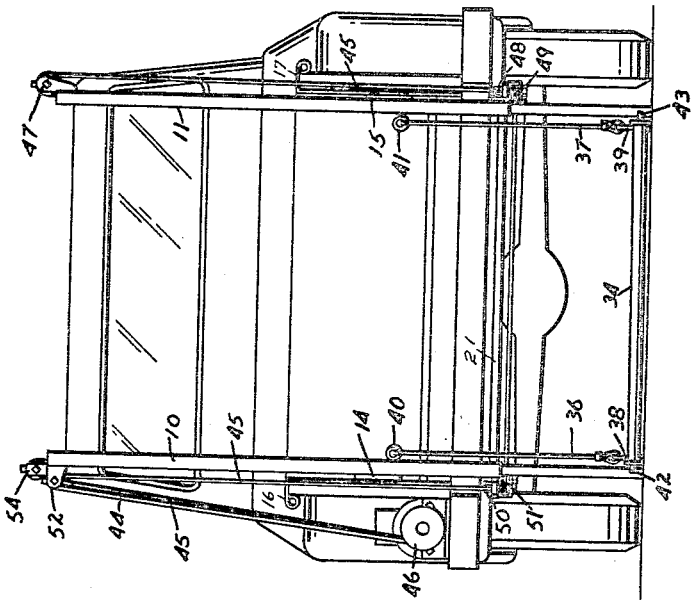
FIGURE 2 is a similar view of FIGURE 1 showing the tailgate lowered to ground level.

Referring now to the drawings, the tailgate hoist of my invention comprises two outer hollow standards 10 and 11 which are rectangular metal tubes with slots 12 and 13 extending vertically in the walls thereof which face each other. These standards are stationary and are mounted to the pick-up body by brackets 14 and 15 (FIGURE 5) which are metal plates that bolt or are otherwise secured to the outer side walls of the rectangular standards 10 and 11 and bolted to the side walls 16 and 17 of the pick-up body. At their lower ends the hollow standards 10 and 11 carry brackets 18 and 19. One or more cross ties such as 20 and 21 (FIGURE 4) may be used to tie the lower ends of the standards 11 together. As shown, the cross tie 20 is welded to the brackets 18 and 19 and the cross tie 21 is bolted to the standards 10 and 11. The brackets 18 and 19 are, of course, welded or otherwise secured to the standards 10 and 11. The cross ties 20 and 21 may be of variable length. The plate brackets 14 and 15 and the cross ties 20 and 21 serve to provide a fixed spacing of the standards 10 and 11.

Within the standards 10 and 11 I provide hollow standards 22 and 23 which are alike. These standards are also rectangular in cross section and are slotted lengthwise of their outer faces as indicated at 24 and 25. These standards 22 and 23 are slidable vertically within the standards 10 and 11. At their lower ends the standards 22 and 23 have cross members 26 and 27 welded in place. Pins 28 and 29 are secured in the members 26 and 27 and extend through the walls of these standards toward each other and they pass through the slots 12 and 13 which extend to the lower ends of the standards 10 and 11. Wear washers 30 and 31 are placed around the pins. Between these washers a tube 32 surrounds the pins 28 and 29 and connects them. The tube 32 forms a bearing surface for a tube 33 which is formed on one edge of a tailgate 34, thus forming a pivotal mounting of the tailgate to the lower ends of the standards 22 and 23.

The tailgate 34 is limited in its rearward swinging movement by flexible members 36 and 37 which are secured to the tailgate 34 by eye bolts 38 and 39 and secured to the standards 22 and 23 by eye bolts 40 and 41. To hold the tailgate in upright position it is provided with sliding latch pins 42 and 43 which can be moved into openings in the standards 22 and 23.

The vertical positioning of the tailgate 34 when it is being used as a hoist is accomplished by a pair of flexible members 44 and 45, a series of sheaves and a power driven winch 46.

One flexible member 45 is secured to the pin 29 inside the standard 23 and extends up through the standards 23 and 11, passing out through the slot 25 in the standard 23, then over the top of the standard 11 to a sheave 47 mounted on the standard 11, then downward around sheaves 48 and 49 mounted on the bracket 19 at the lower end of the standard 11, then across to sheaves 51 and 50 mounted on the bracket 18 at the lower end of the standard 10 and up outside the standard 10 to a sheave 52 mounted on that standard and to one drum section 53 of the winch 46.

The other flexible member 44 is secured to the pin 28 inside the standard 22 and extends up through the standards 22 and 10, out through the slot 24 over a sheave 54 mounted on the standard 10 alongside the sheave 52, then down to a second drum section 55 of the winch 46. The drum sections 53 and 55 are driven together by a reversible electric motor 56 (FIGURE 5) having a gear reduction unit 57 so as to rotate the drum sections at a low speed. The power unit 56–57 is available on the market and can be operated by electric current obtained directly from the batteries and generator of the automotive vehicle.

Figure 1:
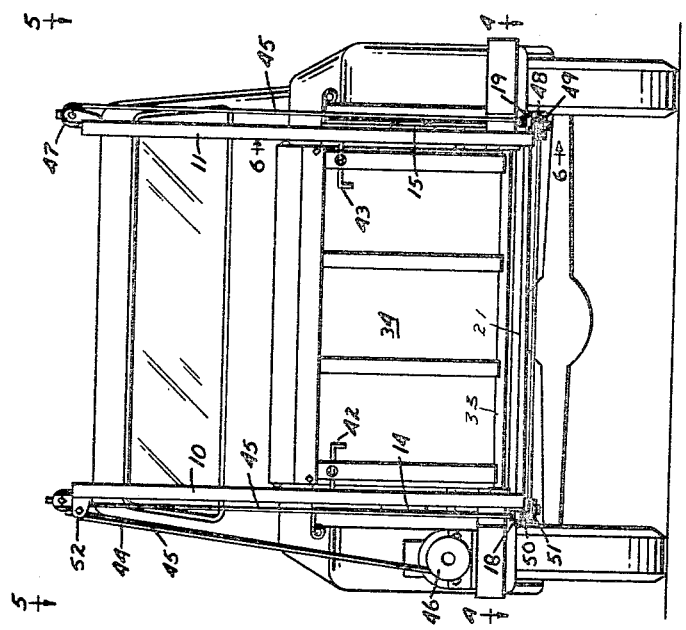
FIGURE 1 is a rear end view of a pick-up truck showing my invention applied thereto and showing the tailgate in closed position to close the rear end of the pick-up body.

The power unit and the winch can be mounted as shown in FIGURES 1 and 2, or on the wide top flange of the wall 16 of the pick-up body, as shown in FIGURE 3.

The distance of elevation of loads above the body floor on the tailgate 34 is limited only by the height of the standards 10 and 11. These standards are shown in the drawings to be about the level of the top of the vehicle cab. The particular combination of the fixed outer hollow standards with vertical slots in their walls that face each other and the slidable hollow standards with the vertical slots in their outwardly facing walls makes a strong standard construction and provides access at the proper places for securing the brackets 14 and 15, the various tailgate parts 28, 29, and 38–43.

It will be noted also that in FIGURES 3 and 6, the tops of the standards 22 and 23 are recessed or notched as indicated by the numerals 58 and 59 to support a cross bar 60 in such a fashion that the cross bar 60 may move up and down through the slots 12 and 13 in the standards 10 and 11. I have shown this cross bar as equipped with an A-frame 61 which can be used with any well known connecting means such as a chain to lift miscellaneous items.

The nature and advantages of my invention are believed to be readily apparent from the foregoing description.

I claim:

1. A tailgate hoist for trucks, etc. comprising:

two spaced apart stationary upright hollow standards open at both ends;

bracket means for attaching said standards to the truck body at the rear ends of the side walls thereof;

a hollow standard slidable up and down within each of said first named standards and having its outwardly facing wall provided with a vertical slot;

a tailgate pivotally mounted on the lower ends of the slidable hollow standards;

latch means on the tailgate and slidable standards to secure the tailgate in upright position to bridge the space between the said standards and thus close the rear end of the body;

means on the tailgate and said slidable standards operable to hold said tailgate in a horizontal rearwardly extended position;

said first named hollow standards having vertical slots in their walls that face each other through which the tailgate is interconnected to said slidable standards, and having sheaves at the top thereof opposite the slots;

a power driven winch supported by the truck body adjacent one of said first named standards;

and flexible members affixed to the slidable standards at their lower ends and extending upwardly therein to the tops of the first named standards, then out through the slots in the slidable standards over the said sheaves to said winch.

2. The tailgate hoist defined in claim 1 wherein the stationary channels carry sheaves for guiding the flexible member that goes over the sheave at the top of the stationary standard most remote from the winch beneath the truck body to the other side thereof and to said winch.

3. The tailgate hoist defined in claim 1 wherein the upper ends of the slidable standards have recesses and a cross bar is seated in said recesses.

References Cited by the Examiner

UNITED STATES PATENTS

| 2,635,771 | 4/1953 | Black | 214—75 |
| 2,640,612 | 6/1953 | Barry | 214—75 |
| 2,706,565 | 4/1955 | Krasno | 214—75 |
| 3,035,720 | 5/1962 | Selzer | 214—75 |
| 3,174,634 | 3/1965 | Peck | 214—75 |

GERALD M. FORLENZA, *Primary Examiner.*

ROBERT G. SHERIDAN, *Examiner.*